Nov. 6, 1951
R. O. BOYKIN, JR
2,573,830
IMPULSE TESTING DEVICE
Filed Aug. 25, 1945
2 SHEETS—SHEET 1
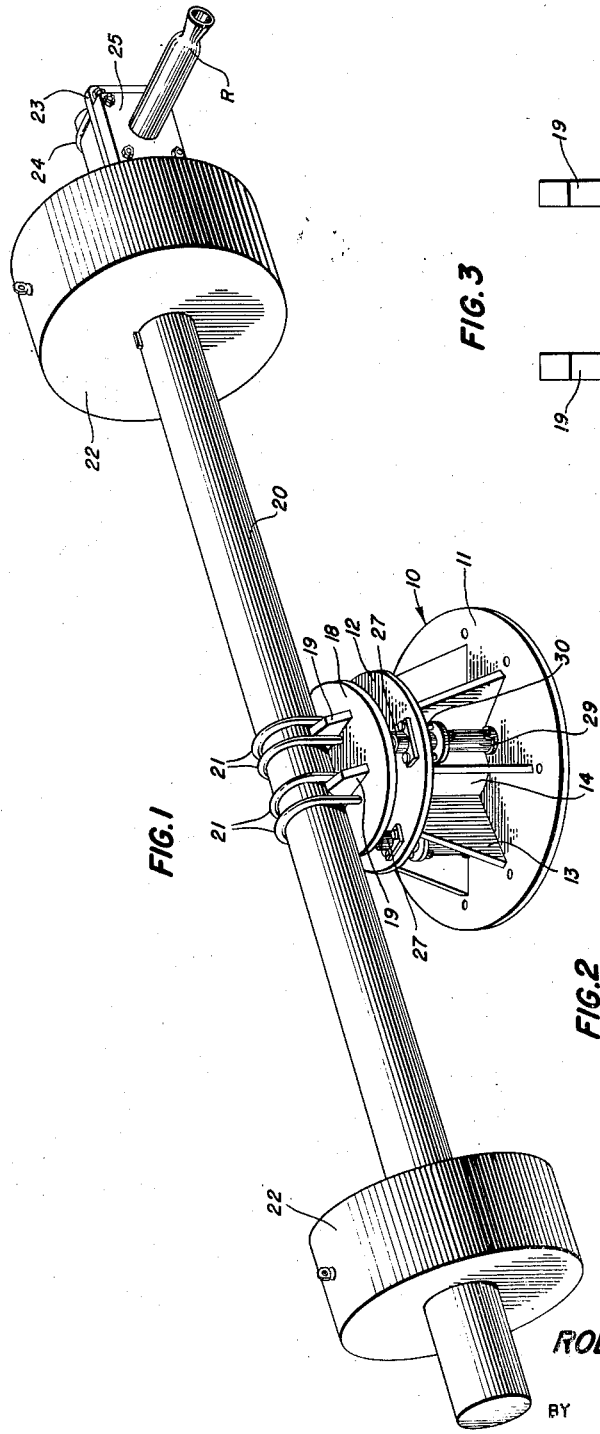
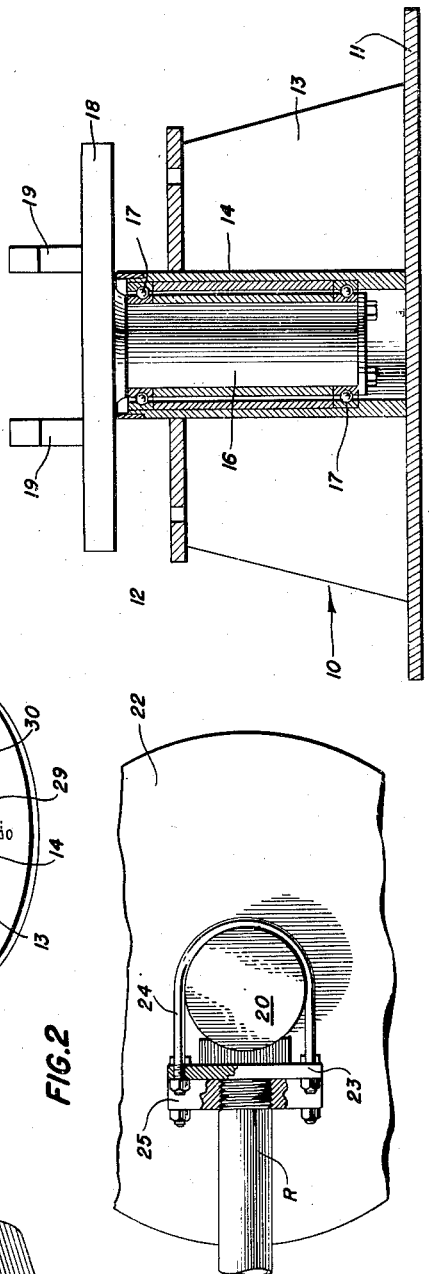
INVENTOR
ROBERT O. BOYKIN JR.
BY
ATTORNEY Nov. 6, 1951 R. O. BOYKIN, JR 2,573,830
IMPULSE TESTING DEVICE
Filed Aug. 25, 1945 2 SHEETS—SHEET 2

INVENTOR
ROBERT O. BOYKIN JR.
BY
ATTORNEY

Patented Nov. 6, 1951

2,573,830

UNITED STATES PATENT OFFICE 2,573,830

IMPULSE TESTING DEVICE

Robert O. Boykin, Jr., Los Angeles, Calif., assignor to the United States of America as represented by the Secretary of the Navy Application August 25, 1945, Serial No. 612,678

1 Claim. (Cl. 73—141)

This invention relates to impulse testers, and more particularly to a novel device of this character for testing the impulse imparted by rocket motors.

One object of the present invention is to provide an impulse tester wherein a large mass is rotatably mounted on substantially friction-free bearings and is adapted to carry a rocket or similar device undergoing testing so that the entire impulse of the rocket is transmitted to the rotatable mass and causes the rotatable mass to move at a relatively low, easily measured velocity.

Another object of the invention is to provide an impulse tester which is both accurate and dependable in its operation and which may be used repeatedly without impairing its operation.

These and other objects of the invention may be better understood by reference to the accompanying drawings, in which:

Fig. 1 is a perspective view of one form of the new impulse tester with a rocket motor in position thereon;

Fig. 2 is an end view of the tester, partly in section, showing the mounting for the rocket motor;

Fig. 3 is a vertical sectional view of the mounting for the rotating mass;

Figure 4:
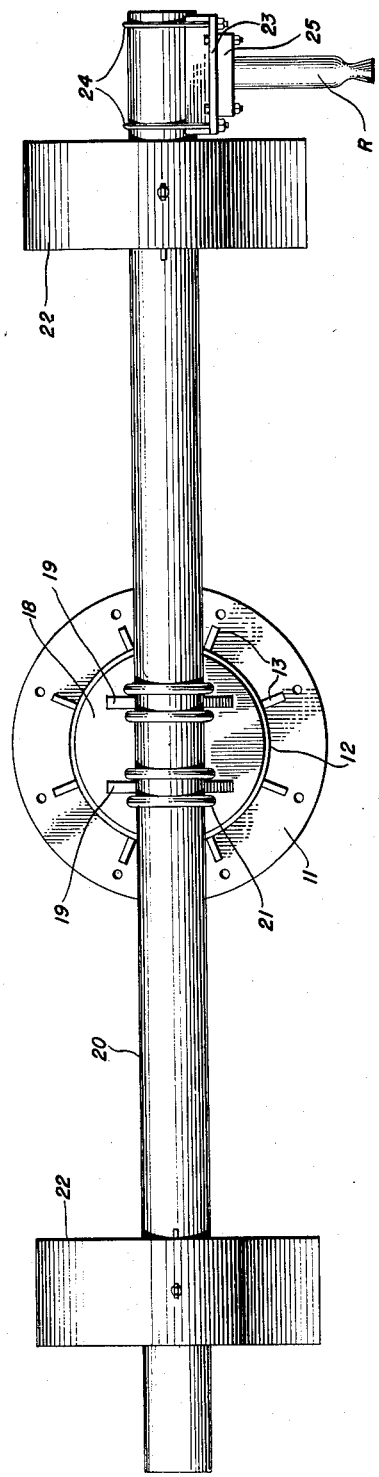
Fig. 4 is a plan view of the tester.
Figure 5:
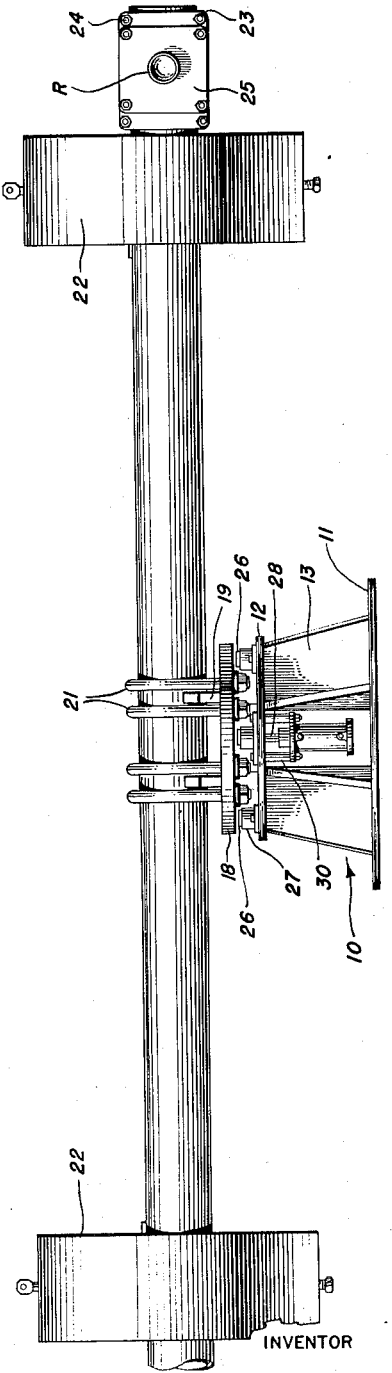
Fig. 5 is a front view of the tester.

The impulse tester includes a mass rotatably supported by a housing structure 10 which comprises a base plate 11 and a top plate 12 separated by vertical ribs or webs 13 and a central vertically disposed shell 14. A spindle 16 is journaled in the shell by means of ball or roller bearings 17. The upper end of the spindle supports a table 18 which may be integral with the spindle. Two brackets 19 are positioned on the table and support a beam 20, the beam being secured in place by U-bolts 21 which extend thereover and project through the table 18. Near the extremities of the beam 20 are massive weights 22 which may be axially adjustable.

One end of the beam 20 is provided with a saddle 23 secured thereto by U-bolts 24. The saddle 23 provides a vertical base to which is attached a thrust cap 25 into which may be secured a rocket motor R. The axis of the rocket motor extends horizontally and at right angles to the axis of the beam 20.

The total mass of the weights 22, beam 20, table 18 and spindle 16 is quite large in comparison to the mass of the propellant contained in the motor R or, more accurately, the mass of the gases which are evolved when the rocket is ignited. The weights 22 and beam 20 have simple geometrical outlines in order to facilitate the calculation of their moments of inertia.

Operation of the impulse tester is as follows:

A rocket motor R is attached to the thrust cap 25, as indicated in Figs. 1 and 2. Its propellant charge is ignited by any suitable means, not shown. Upon ignition, the propellant charge exerts an impulse tending to rotate the beam 20 and its weights. This impulse has a comparatively short duration; that is, the propellant may burn for a fraction of a second or several seconds depending upon the design of the rocket. The effective mass of the rotating parts of the tester is sufficiently greater than the mass of the propellant or its discharge gases that the beam 20 is caused to rotate relatively slowly on the spindle 16. For example, the gases may issue from the rocket at several thousand feet per second and cause the tester to rotate with a peripheral speed of 10 to 20 feet per second. Because of the great mass of the tester and the manner in which it is mounted, it will continue to rotate for a long period so that the velocity of its rotation may be accurately measured by any suitable means, not shown. Once this velocity is known the solution of an equation to determine the impulse of the rocket motor may be readily obtained.

In order to stop rotation after the velocity of rotation has been determined, brake shoes 26 are caused to engage the lower surface of the table 18. The brake shoes are mounted in guides 27 carried by the upper or top plate 12 of the housing structure 10 and are actuated by piston rods 28 which extend upwardly from brake cylinders 29 suspended from the top plate 12 by spacers 30.

I claim:

An impulse tester for rockets comprising a base member adapted to provide a substantially horizontal reference plane, a journal box secured to said base member with its axis normal to said plane, a spindle rotatably supported within said journal box and having a disk-like member secured to the exposed end thereof to provide a table-like surface parallel to said plane, a beam, means supporting said beam horizontally on said table-like surface with the mid-point thereof substantially coincident with said axis, a weight adjustably supported on each end portion of said beam, and means for mounting a rocket motor near one end of said beam so that its axis of thrust is parallel to said plane and perpendicular to said beam, whereby the impulse expended by said rocket in accelerating said beam from a state of rest may be determined by measuring the terminal angular velocity of said beam.

ROBERT O. BOYKIN, JR.

REFERENCES CITED

The following references are of record in the file of this patent:

UNITED STATES PATENTS

| Number | Name | Date |
|---|---|---|
| 370,356 | Schuetz | Sept. 20, 1887 |
| 1,808,811 | Gioiosa | June 9, 1931 |
| 1,976,405 | Le Witt | Oct. 9, 1934 |
| 2,011,857 | Holmes | Aug. 20, 1935 |
| 2,111,315 | Damblanc | Mar. 15, 1938 |

FOREIGN PATENTS

| Number | Country | Date |
|---|---|---|
| 522,556 | Great Britain | June 20, 1940 |